United States Patent
Gilles

(10) Patent No.: US 9,227,611 B2
(45) Date of Patent: Jan. 5, 2016

(54) HYDRAULIC VEHICLE BRAKING SYSTEM WITH ELECTROMECHANICAL ACTUATOR, AND METHOD FOR OPERATING SUCH A HYDRAULIC VEHICLE BRAKING SYSTEM

(75) Inventor: Leo Gilles, Koblenz (DE)

(73) Assignee: Lucas Automotive GmbH, Koblenz (DE)

(*) Notice: Subject to any disclaimer, the term of this patent is extended or adjusted under 35 U.S.C. 154(b) by 87 days.

(21) Appl. No.: 14/116,349

(22) PCT Filed: Mar. 13, 2012

(86) PCT No.: PCT/EP2012/001119
§ 371 (c)(1),
(2), (4) Date: Feb. 6, 2014

(87) PCT Pub. No.: WO2012/152352
PCT Pub. Date: Nov. 15, 2012

(65) Prior Publication Data
US 2014/0197680 A1    Jul. 17, 2014

(30) Foreign Application Priority Data

May 10, 2011  (DE) .......................... 10 2011 101 066

(51) Int. Cl.
*B60T 13/74*    (2006.01)
*B60T 13/14*    (2006.01)
(Continued)

(52) U.S. Cl.
CPC ................. *B60T 13/58* (2013.01); *B60T 8/175* (2013.01); *B60T 8/176* (2013.01); *B60T 8/1755* (2013.01); *B60T 8/3275* (2013.01); *B60T 8/4077* (2013.01); *B60T 8/42* (2013.01); *B60T 8/4275* (2013.01);

(Continued)

(58) Field of Classification Search
CPC ..... B60T 11/18; B60T 13/143; B60T 13/145; B60T 13/745; B60T 2270/82
See application file for complete search history.

(56) References Cited

U.S. PATENT DOCUMENTS 7,419,227 B2    9/2008    Marlhe et al.
8,468,820 B2    6/2013    Drumm
(Continued)

FOREIGN PATENT DOCUMENTS

CN    101263033 A    9/2008
DE    10327553 A1    1/2005
(Continued)

OTHER PUBLICATIONS

Chinese First Office Action, Application No. 201280021840.5, dated Jun. 2, 2015.

*Primary Examiner* — Anna Momper
(74) *Attorney, Agent, or Firm* — MacMillan, Sobanski & Todd, LLC

(57) ABSTRACT

A hydraulic vehicle braking system comprises a master cylinder having at least one piston displacably accommodated therein, a mechanical actuator that is coupled, or can be coupled, to a brake pedal for actuating the piston, and an electromechanical actuator. The electromechanical actuator is likewise provided for actuating the piston and can be activated, at least for boosting or generating brake force, when the brake pedal is actuated. Furthermore, a valve arrangement is provided, which has a first valve per wheel brake for selectively uncoupling the wheel brake from the master cylinder, and a second valve for selectively reducing the brake pressure at the wheel brake. The valve arrangement can be controlled at least within the framework of an ABS control mode.

18 Claims, 3 Drawing Sheets

(51) Int. Cl.
  *B60T 13/58* (2006.01)
  *B60T 8/32* (2006.01)
  *B60T 8/40* (2006.01)
  *B60T 8/42* (2006.01)
  *B60T 8/48* (2006.01)
  *B60T 8/175* (2006.01)
  *B60T 8/1755* (2006.01)
  *B60T 8/176* (2006.01)

(52) U.S. Cl.
  CPC ............ *B60T 8/4845* (2013.01); *B60T 8/4872* (2013.01); *B60T 13/143* (2013.01); *B60T 13/745* (2013.01)

(56) References Cited

U.S. PATENT DOCUMENTS

| | | | |
|---|---|---|---|
| 8,540,324 | B2 | 9/2013 | Leiber et al. |
| 8,997,482 | B2 * | 4/2015 | Richard et al. ................. 60/545 |
| 2006/0163941 | A1 | 7/2006 | Von Hayn et al. |
| 2009/0026835 | A1 | 1/2009 | Matsubara et al. |
| 2011/0031072 | A1 | 2/2011 | Leiber et al. |
| 2011/0115282 | A1 | 5/2011 | Dinkel et al. |
| 2012/0013173 | A1 | 1/2012 | Leiber et al. |
| 2013/0234501 | A1 | 9/2013 | Leiber |

FOREIGN PATENT DOCUMENTS

| | | |
|---|---|---|
| DE | 10338046 A1 | 3/2005 |
| DE | 102008039306 A1 | 5/2009 |
| DE | 102010024734 A1 | 5/2011 |
| DE | 102010022493 A1 | 12/2011 |
| EP | 1738983 A2 | 1/2007 |
| EP | 2019010 A2 | 1/2009 |
| EP | 2103493 A1 | 9/2009 |
| FR | 2874880 A1 | 3/2006 |
| JP | 2007131130 A | 5/2007 |
| JP | 2007284007 A | 11/2007 |
| JP | 4088802 B1 | 5/2008 |
| WO | 2004110840 A1 | 12/2004 |
| WO | 2006111393 A1 | 10/2006 |
| WO | 2008122469 A1 | 10/2008 |
| WO | 2009083216 A2 | 7/2009 |
| WO | 2010007119 A2 | 1/2010 |
| WO | 2010091883 A1 | 8/2010 |
| WO | WO 2011026804 A1 * | 3/2011 |
| WO | WO 2011063955 A2 * | 6/2011 |
| WO | 2012062393 A1 | 5/2012 |

* cited by examiner

US 9,227,611 B2

HYDRAULIC VEHICLE BRAKING SYSTEM WITH ELECTROMECHANICAL ACTUATOR, AND METHOD FOR OPERATING SUCH A HYDRAULIC VEHICLE BRAKING SYSTEM

CROSS-REFERENCE TO RELATED APPLICATIONS

This application is a national stage of International Application No. PCT/EP2012/001119 filed Mar. 13, 2012, the disclosures of which are incorporated herein by reference in entirety, and which claimed priority to German Patent Application No. DE 10 2011 101 066.5 filed May 10, 2011, the disclosures of which are incorporated herein by reference in entirety.

BACKGROUND OF THE INVENTION

The present disclosure relates generally to the field of vehicle braking systems. To be more precise, a hydraulic vehicle braking system equipped with an electromechanical actuator is described.

Electromechanical actuators have already been used for some time in vehicle braking systems or have been proposed for such a use. In the case of hydraulic braking systems, electromechanical actuators are employed, for example, for realising an electrical parking brake function (EPB). In the case of electromechanical braking systems (EMB), they replace the conventional hydraulic cylinders at the wheel brakes.

Owing to technical advances, the efficiency of the electromechanical actuators has continually increased. It was therefore considered to use such actuators also for implementing modern brake control functions. Such brake control functions include an antilock braking system (ABS), a traction control system (TCS) or an electronic stability program (ESP), also referred to as vehicle stability control (VSC). WO 2006/111393 A1 and corresponding U.S. Pat. No. 8,540,324 B2, the disclosures of which are incorporated by reference herein in entirety, for instance, teaches a hydraulic braking system having a highly dynamic electromechanical actuator which performs the pressure modulation in the brake control mode. The actuator is provided to actuate a master cylinder of the braking system.

Owing to the high dynamics of the electromechanical actuator, the hydraulic components of the braking system known from WO 2006/111393 A1 can be reduced to a single 2/2-way valve per wheel brake. To realise wheel-individual pressure modulations, the valves are then driven individually or in groups in multiplex operation.

However, the minimising to only one valve per wheel brake also results in problems, such as an undesired pressure equalisation when valves are opened simultaneously, which have to be solved again in a complex manner (cf. WO 2010/091883 A1 and corresponding U.S. Patent Publication No. 2012/0013173 A1, the disclosures of which are incorporated by reference herein in entirety). A further disadvantage is that multiplex operation requires an electromechanical actuator whose dynamic range has to be greater by at least a factor of the order or 4 compared with conventional electromechanical actuators.

BRIEF SUMMARY OF THE INVENTION

A hydraulic vehicle braking system having an electromechanical actuator is therefore to be provided which avoids one or more of the disadvantages associated with multiplex operation.

According to a first aspect, a hydraulic vehicle braking system is specified which comprises the following: a master cylinder having at least one piston displaceably accommodated therein, a mechanical actuator, coupled or couplable to a brake pedal, for actuating the piston, an electromechanical actuator for actuating the piston, the electromechanical actuator being drivable at least for brake force boosting or brake force generation upon an actuation of the brake pedal, and a first valve arrangement, which per wheel brake has a first valve for selectively uncoupling the wheel brake from the master cylinder and a second valve for selectively reducing the brake pressure at the wheel brake, the first valve arrangement being drivable at least in the context of an ABS control mode.

According to a first variant, the electromechanical actuator is configured to actuate the master cylinder piston in the context of a brake force boosting. The brake force to be boosted can in this case be exerted on the master cylinder piston by means of the mechanical actuator. According to another variant, the electromechanical actuator is configured to actuate the master cylinder piston for brake force generation. This variant can be used, for example, in the context of a brake-by-wire (BBW) operation, in which the brake pedal is normally mechanically decoupled from the master cylinder piston. In the case of a braking system designed for BBW operation, the mechanical actuator is used to actuate the master cylinder piston, for instance, in the event of failure of a BBW component (i.e. in the event of an emergency braking).

To drive the electromechanical actuator, the first valve arrangement and optional further components of the vehicle braking system, the braking system can have suitable drive devices. These drive devices can comprise electrical, electronic or program-controlled assemblies and combinations thereof. For example, the drive devices can be provided in a common or else in separate control devices (electronic control units, ECUs).

The electromechanical actuator can have an electric motor and a transmission coupled to the electric motor on the drive side. The transmission can extend concentrically or parallel with respect to the mechanical actuator. According to one variant, the transmission is configured as a nut/spindle arrangement (e.g. as a ball screw), but other variants (e.g. a rack drive) are also conceivable.

The electric motor of the electromechanical actuator can have a rotor extending concentrically with respect to the mechanical actuator. The rotor can drive a thread configured as a nut/spindle arrangement or form a component of the nut/spindle arrangement.

According to one variant, the hydraulic vehicle braking system further comprises a decoupling device for selectively decoupling the brake pedal from the master cylinder piston. Furthermore, a simulation device can be provided, which provides a pedal reaction behaviour to which the driver is accustomed when the brake pedal is decoupled from the piston. The simulation device can be based on a hydraulic operating principle. Thus, the simulation device can be configured, for example, as a cylinder/piston arrangement for reaction-associated reception of hydraulic fluid.

Depending on the configuration of the vehicle braking system, the selective decoupling of the brake pedal from the master cylinder piston by means of the decoupling device can occur for different purposes. In the case of a braking system designed according to the BBW principle, apart from an emergency braking mode (in which the brake pedal is coupled to the master cylinder piston via the mechanical actuator), permanent decoupling can be provided. In the case of a regenerative braking system, such a decoupling can take place at least in the context of a regenerative braking mode (generator mode). In other braking systems, the decoupling device and the simulation device can also be completely omitted.

The vehicle braking system can further comprise at least one low-pressure accumulator which receives hydraulic fluid discharged from the wheel brakes in the context of a brake pressure reduction. The at least one low-pressure accumulator can be couplable to the corresponding wheel brake via the second valve assigned to each wheel brake. Furthermore, the low-pressure accumulator can be coupled to an inlet side of the first valve in order to release the received hydraulic fluid via a non-return valve. According to one configuration, the non-return valve is switched in such a manner that no hydraulic fluid displaced from the master cylinder can pass directly into the low-pressure accumulator.

As an option, the vehicle braking system comprises an electrically operated hydraulic pressure generator provided in addition to the master cylinder. The hydraulic pressure generator can comprise, for example, a hydraulic pump or a plunger arrangement and an electric motor for actuating the same. The at least one low-pressure accumulator can be coupled to an inlet side of the hydraulic pressure generator in order to release the received hydraulic fluid. In this manner, the hydraulic fluid conveyed by the hydraulic pressure generator can (also) be drawn from the low-pressure accumulator.

The hydraulic pressure generator can be drivable in a brake control mode which is different from the brake force boosting or brake force generation. As already explained above, a corresponding drive device can comprise a suitably programmed control device. On provision of the hydraulic pressure generator which is drivable in a brake control mode which is different from the brake force boosting or brake force generation, according to one variant the electromechanical actuator can be drivable exclusively for the purpose of the brake force boosting or brake force generation upon actuation of the brake pedal. Alternatively to this, the electromechanical actuator can be drivable additionally in at least one brake control mode which is different from the ABS control mode, and in this case the hydraulic pressure generator can be drivable exclusively in the ABS control mode. This brake control mode which is different from the ABS control mode can comprise a traction control mode and/or an electronic stability program (ESP).

With regard to the traction control mode and the electronic stability program, a second valve arrangement can be provided, which enables a selective uncoupling of the master cylinder from an outlet side of the hydraulic pressure generator in the operating modes (traction control mode/ESP) mentioned. The second valve arrangement can comprise, for example, one 2/2-way valve per brake circuit.

In an alternative configuration of the hydraulic vehicle braking system, the latter comprises no electric motor-actuable hydraulic pressure generator provided in addition to the master cylinder. In this case, all of the pressure modulations arising in the context of a brake control mode are realised by means of the electromechanical actuator. The electromechanical actuator can thus be drivable not only for brake force boosting or brake force generation upon an actuation of the brake pedal (especially in the case of a service braking) but additionally also in the context of a brake control mode (including an ABS control mode).

According to one realisation, the vehicle braking system comprises a third valve arrangement, which enables the reduction of hydraulic pressure at the wheel brakes in the event of failure of the electromechanical actuator. The third valve arrangement can be configured to selectively couple, when the first valve is open, the associated wheel brake to an unpressurised hydraulic fluid reservoir for hydraulic pressure reduction.

Alternatively or additionally to the hydraulic pressure reduction, the third or a fourth valve arrangement can also be designed to selectively couple at least one chamber of the master cylinder, in which the master cylinder piston is accommodated, to an unpressurised hydraulic fluid reservoir. Such a coupling may be desirable, for example, in the regenerative braking mode. In this manner, in the regenerative braking mode upon an actuation of the master cylinder piston, the hydraulic fluid can pass from the at least one master cylinder chamber to the unpressurised hydraulic fluid reservoir, without a brake pressure build-up (usually undesired in the regenerative braking mode) occurring at the wheel brakes.

Furthermore, a method for operating a hydraulic vehicle braking system is specified. The vehicle braking system has a master cylinder having at least one piston displaceably accommodated therein, a mechanical actuator, coupled or couplable to a brake pedal, for actuating the piston, an electromechanical actuator for actuating the piston, and a first valve arrangement, which per wheel brake has a first valve for selectively uncoupling the wheel brake from the master cylinder and a second valve for selectively reducing the brake pressure at the wheel brake. The method comprises driving the electromechanical actuator at least for brake force boosting or brake force generation upon an actuation of the brake pedal, and driving the first valve arrangement at least in the context of an ABS control mode. The driving of the electromechanical actuator and of the first valve arrangement can take place in a temporally offset or temporally overlapping manner.

Other advantages of this invention will become apparent to those skilled in the art from the following detailed description of the preferred embodiments, when read in light of the accompanying drawings.

DETAILED DESCRIPTION OF THE INVENTION

Figure 1:
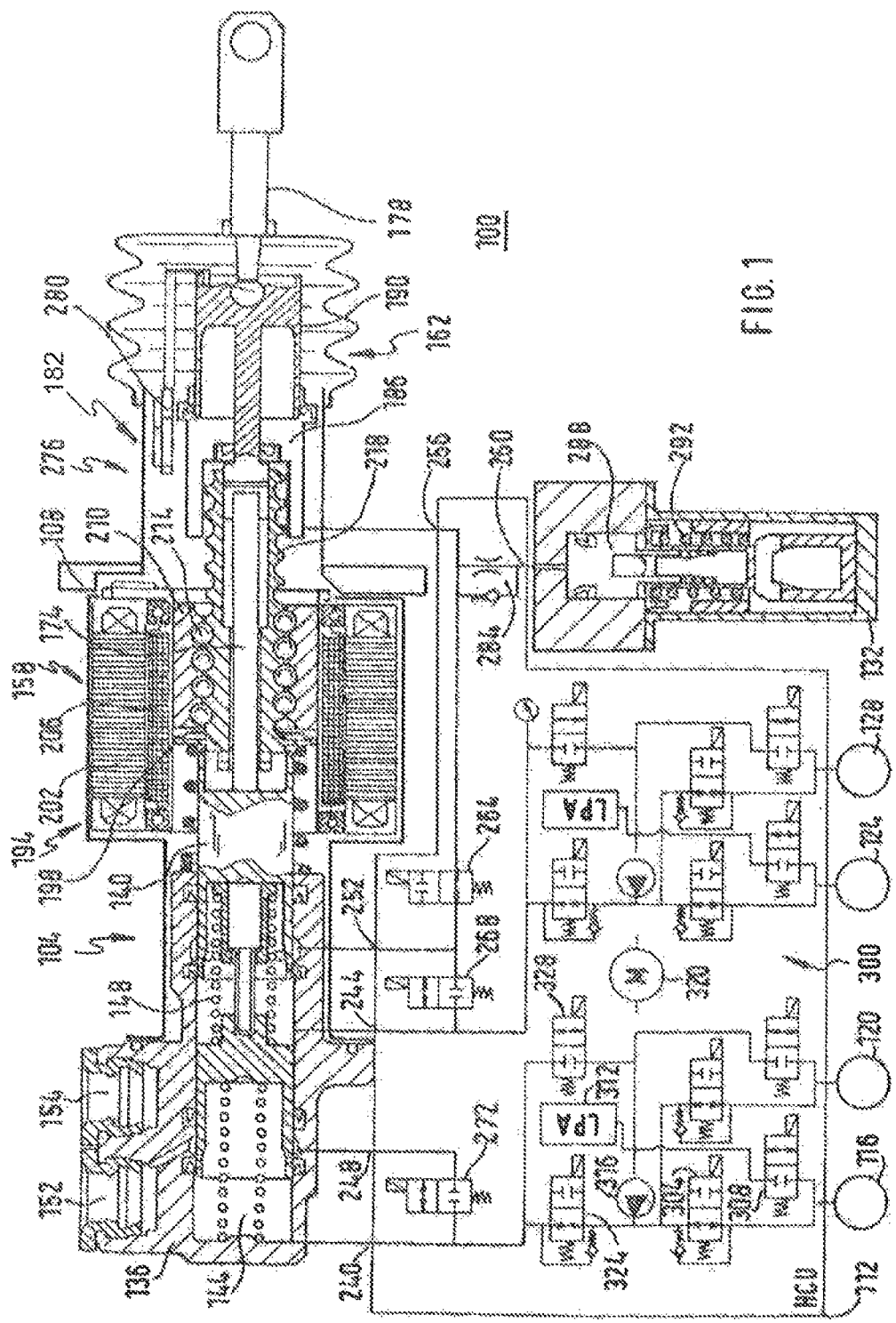
FIG. 1 shows a first embodiment of a hydraulic vehicle braking system.

FIG. 1 shows a first embodiment of a hydraulic vehicle braking system 100, which may be based on the brake-by-wire (BBW) principle and optionally (e.g. in the case of hybrid vehicles) may also be operated in a regenerative mode. The braking system 100 comprises a master cylinder assembly 104 which is mounted on a front bulkhead 108 of the vehicle, a hydraulic control unit (HCU) 112 which is functionally arranged between the master cylinder assembly 104 and wheel brakes 116, 120, 124, 128 of the vehicle, and a simulation device 132 for providing a pedal reaction behaviour. The HCU 112 is configured as an integrated assembly and comprises a large number of individual components, as well as several fluid inlets and fluid outlets.

The master cylinder assembly 104 has a master cylinder 136 with a piston 140 accommodated displaceably therein. The master cylinder piston 140 is configured as a tandem piston and defines in the master cylinder 136 two hydraulic chambers 144, 148 separated from one another. The two hydraulic chambers 144, 148 of the master cylinder 136 are connected to an unpressurised hydraulic fluid reservoir (not illustrated) via respectively one connection 152, 154 in order to supply them with hydraulic fluid.

The hydraulic assembly 104 further comprises an electromechanical actuator 158 and a mechanical actuator 162. Both the electromechanical actuator 158 and the mechanical actuator 162 enable an actuation of the master cylinder piston 140 and for this purpose act on an input-side end face of the master cylinder piston 140. The actuators 158, 162 are configured in such a manner as to be able to actuate the master cylinder piston 140 independently of one another.

The mechanical actuator 162 has an actuating member 174 which is configured in the form of rod and is able to act directly on the input-side end face of the master cylinder piston 140. Furthermore, the mechanical actuator 162 has an input member 178. The input member 178 is configured to be coupled in an articulated manner to a brake pedal (not illustrated).

A decoupling device 182 is functionally provided between the input member 178 and the actuating member 174. The decoupling device 182, which may be regarded as part of the mechanical actuator 162, enables a selective decoupling of the master cylinder piston 140 from the brake pedal. For this purpose, the decoupling device 182 comprises a hydraulic chamber 186 and a plunger 190 displaceably accommodated in the hydraulic chamber 186. The plunger 190 is coupled to the input member 178 on the input side via a ball joint. On the output side, the plunger 190 acts in the emergency braking mode directly on that end side of the actuating member 174 facing away from the master cylinder piston 140. The functioning of the decoupling device 182 will be explained in more detail later in connection with the HCU 112.

The electromechanical actuator 158 has an electric motor 194 and a transmission 198 downstream of the motor 194 on the drive side. The motor 194 has a cylindrical design and extends concentrically with respect to the master cylinder piston 140 and the actuating member 174 of the mechanical actuator 162. To be more precise, the motor 194 is arranged radially outside with respect to these components 140, 174. The motor 194 comprises a stator 202 and a rotor 206 provided radially inside with respect to the stator 202. The rotor 206 extends concentrically with respect to the master cylinder piston 140 and the actuating member 174 of the mechanical actuator 162.

The rotor 206 of the motor 194 is coupled in a rotationally fixed manner to the transmission 198 configured as a ball screw. In this arrangement, the rotor 206 drives an axially nondisplaceably mounted sleeve member 210 of the transmission 198. The rotary movement of the sleeve member 210 is transmitted via a large number of ball bodies 214 to an axially displaceably mounted hollow spindle 218 of the transmission 198, so that the rotary movement of the sleeve member 210 results in an axial displacement of the hollow spindle 218. In this procedure, the end side, on the left in FIG. 1, of the hollow spindle 218 can come into abutment with the end side, on the right in FIG. 1, of the master cylinder piston 140 and consequently displace the master cylinder piston 140 to the left in FIG. 1. Alternatively to this, the master cylinder piston 140 can also be displaced to the left in FIG. 1 by the actuating member 174, extending through the hollow spindle 218, of the mechanical actuator 162. A displacement of the master cylinder piston 140 to the right in FIG. 1 is brought about by means of the hydraulic pressure prevailing in the hydraulic chambers 144, 148 (upon release the brake pedal and displacement of the hollow spindle 118 to the right).

In the embodiment illustrated in FIG. 1, the vehicle braking system comprises two brake circuits, the two hydraulic chambers 114, 148 of the master cylinder 136 being assigned to respectively one brake circuit. The HCU 112 has per brake circuit one inlet 240, 244, coupled to the respective hydraulic chamber 144, 148, for hydraulic fluid and respectively one corresponding outlet 248, 252. The two outlets 248, 252 are connected, via corresponding annular chambers in the master cylinder 138 and the master cylinder connections 152, 154, to the unpressurised hydraulic fluid reservoir (not illustrated in FIG. 1). The HCU 112 further has a hydraulic connection 256 for the hydraulic chamber 186 of the decoupling device 182 and a further hydraulic connection 260 for the simulation device 132.

The inlet 240 and the outlet 248 of the hydraulic chamber 144 can be connected to one another via a 2/2-way valve 272. A 2/2-way valve 268 is also arranged between the inlet 244 and the outlet 252 of the hydraulic chamber 148. The two valves 264, 272 enable the reduction of hydraulic pressure at the wheel brakes 116, 120, 124, 128 in the event of failure (e.g. blocking) of the electromechanical actuator 158. For this purpose, the two valves 268, 272 are transferred into their open position, whereby hydraulic fluid can flow out of the wheel brakes 116, 120, 124, 128, via the connections 152, 154, back into the unpressurised hydraulic fluid reservoir.

The two valves 264, 272 furthermore enable, in the regenerative braking mode (generator mode), a targeted hydraulic short-circuit between the two master cylinder chambers 144, 148 on the one hand and on the other hand the unpressurised hydraulic fluid reservoir, which is connected to the chambers 144, 148 via the connections 152, 154. Owing to this hydraulic short-circuit, the hydraulic fluid displaced from the chambers 144, 148 upon a conveying movement of the master cylinder piston 140 is not conveyed to the wheel brakes 116, 120, 124, 128, but can pass directly to the unpressurised hydraulic fluid reservoir without a hydraulic pressure build-up (usually undesired in the regenerative braking mode) occurring at the wheel brakes 116, 120, 124, 128. It should be pointed out the regenerative braking mode can be implemented by axle. In the case of an axle-based brake circuit configuration, therefore, one of the two valves 272, 268 can be closed and the other open in the regenerative braking mode.

A further 2/2-way valve 264 is provided between the hydraulic connection 256 for the hydraulic chamber 186 and the outlet 252. The valve 264 enables a selective activation of the simulation device 132 and the decoupling device 182.

In the following, first the functioning of the HCU 112 in relation to the decoupling device 182 and the simulation device 132 is explained. In this connection, it should again be pointed out that the vehicle braking system 100 according to the embodiment in FIG. 1 is based on the principle of brake-by-wire (BBW). This means that, in the context of a normal service braking, the brake pedal is decoupled from the piston 140 of the master cylinder 136 and the simulation device 132 is activated. A coupling of the master cylinder piston 140 to the brake pedal (via the actuating member 174) takes place, for example, in the event of failure of a BBW component of the electromechanical actuator 158, i.e. in the emergency braking mode.

For an emergency braking, the valve 264 of the HCU 112 is situated, as illustrated in FIG. 1, in an open position, while the two other valves 268, 272 are situated in a closed position. In the open position of the valve 264, the decoupling device 182 assumes its coupling position. In the coupling position, the brake pedal is coupled to the piston 140 of the master cylinder 136.

The emergency braking is initiated by depressing the brake pedal, whereby the input member 178 is displaced to the left in FIG. 1. This displacement of the input member 178 also affects the plunger 190, which thereupon likewise is displaced to the left. The displacement of the plunger 190 results in hydraulic fluid being displaced from the hydraulic chamber 186 of the decoupling device 182 and passing, via the valve 264, the annular chamber formed in the master cylinder 136 and the connection 154, into the unpressurised hydraulic fluid reservoir. The displacement of the plunger 190 in FIG. 1 is transmitted via the actuating member 174 to the master cylinder piston 140. Consequently, the master cylinder piston 140 is also displaced to the left in FIG. 1, whereby hydraulic fluid is conveyed from the hydraulic chambers 144, 148 of the master cylinder 136, via the HCU 112, to the wheel brakes 116, 120, 124, 128.

In the case of a service braking, by contrast, the valve 264 is closed in order to activate the simulation device 132 and the decoupling device 182. For this reason, the hydraulic fluid displaced from the hydraulic chamber 186 of the decoupling device 182 upon an actuation of the brake pedal no longer passes to the unpressurised hydraulic fluid reservoir, but is conveyed via a throttle device 284, with a non-return valve connected in parallel, into the simulation device 132. The simulation device 132 has a hydraulic chamber with a simulator piston 288 arranged therein and subjected to spring force. The characteristic of the helical spring 292 biasing the simulator piston 288 is chosen in such a manner that the pedal reaction behaviour resulting from a displacement of the master cylinder piston 140 is simulated.

In the context of the service braking, the electromechanical actuator 158 performs a brake force generating function in the BBW mode. In this case, the brake force required by depressing the brake pedal is generated by the fact that the hollow spindle 198 is moved to the left in FIG. 1 by means of the electric motor 194 and a force is thereby exerted on the master cylinder piston 140. The level of the brake force resulting therefrom is set in dependence on the sensor-detected brake pedal actuation. For this purpose, a pedal travel sensor 276 is provided, the output signal of which is evaluated by a control device (not illustrated) driving the electric motor 194. The pedal travel sensor 276 comprises a signal transmitter 280 rigidly coupled to the plunger 190, and a detector (not illustrated) which detects the signal transmitter 280.

In the case of a service braking in the BBW mode, it is always ensured that, as can be seen in FIG. 1, a certain distance exists between the mutually facing end sides of the actuating member 174 on the one hand and the plunger 190 on the other hand. This distance corresponds to a decoupling of the brake pedal from the piston 140 of the master cylinder 136 and thus an activation of the decoupling device 182. To maintain the distance, the position of the plunger 190 (and of the brake pedal) is continuously detected by means of the sensor 276 and the electric motor 194 is driven in dependence on the position of the plunger 190 in such a manner that the actuating member 174 magnetically coupled to the hollow spindle 218 is moved to the left in FIG. 1 together with the hollow spindle 218 (with actuation of the piston 140 of the master cylinder 136).

The HCU 112 has, in relation to the brake control mode (ABS, TCS, ESP, etc.), a fundamentally conventional setup with a total of 12 valves (in addition to the valves 264, 268, 272 already explained). Since the electromagnetic actuator 158 is drivable only in the context of a brake force generation, owing to a corresponding design of the control device assigned to this actuator 158, the additional brake control functions are performed in a known manner by means of the HCU 112. For this purpose, the HCU 112 has a conventional ABS valve arrangement 300, which is explained in more detail below with reference, by way of example, to the wheel brake 116.

As illustrated in FIG. 1, the ABS valve arrangement 300 for the wheel brake 116 (and also for the further wheel brakes 120, 124, 128) comprises in each case a first valve 304 for selectively uncoupling the wheel brake 116 from the master cylinder 136, and a second valve 308 for selective brake pressure reduction at the wheel brake 116. In the case of a service braking, the two valves 304, 308 are situated in the position illustrated in FIG. 1, so that hydraulic fluid can pass from the hydraulic chamber 144 of the master cylinder 136 to the wheel brake 116 (and back again).

In the ABS control mode, the valves 304, 308 are driven in a suitable manner by an ABS control device (not illustrated) to realise pressure increase, pressure maintaining and pressure reduction phases. In pressure maintaining phases, both valves 304, 308 are thus closed, while in pressure reduction phases the valve 304 is closed and the valve 308 is opened, so that hydraulic fluid can pass from of the wheel brake 116 into the low-pressure accumulator 312.

For brake pressure build-up in the brake control mode (i.e. independently of an actuation of the brake pedal by the driver), a hydraulic pressure generator in the form of a hydraulic pump 316 with an assigned electric motor 320 is provided. The hydraulic pump 316 is used, in particular, for pressure modulation in the ABS mode.

A driver-independent brake pressure build-up may, however, also become necessary, for example, in the context of a TCS mode and/or an ESP intervention. For driver-independent brake pressure build-up, first the master cylinder 136 is uncoupled from the outlet of the hydraulic pump 316 by closing a shut-off valve 324, while the two valves 304, 308 of the ABS valve arrangement 300 assume the position illustrated in FIG. 1 and a shut-off valve 328 is opened. The hydraulic fluid conveyed by the hydraulic pump 316 is in this case either drawn from the low-pressure accumulator 312 or (via the open shut-off valve 328) from the chamber 144.

In the embodiment illustrated in FIG. 1, the electromechanical actuator 158 performs exclusively the function of a brake booster, downstream of which is a conventional brake control system (HCU 112) in the hydraulic connection to the wheel brakes 116, 120, 124, 128. All of the brake control functions (ABS, TCS, ESP, etc.) are therefore implemented in a conventional manner by means of the HCU 112.

Figure 2:
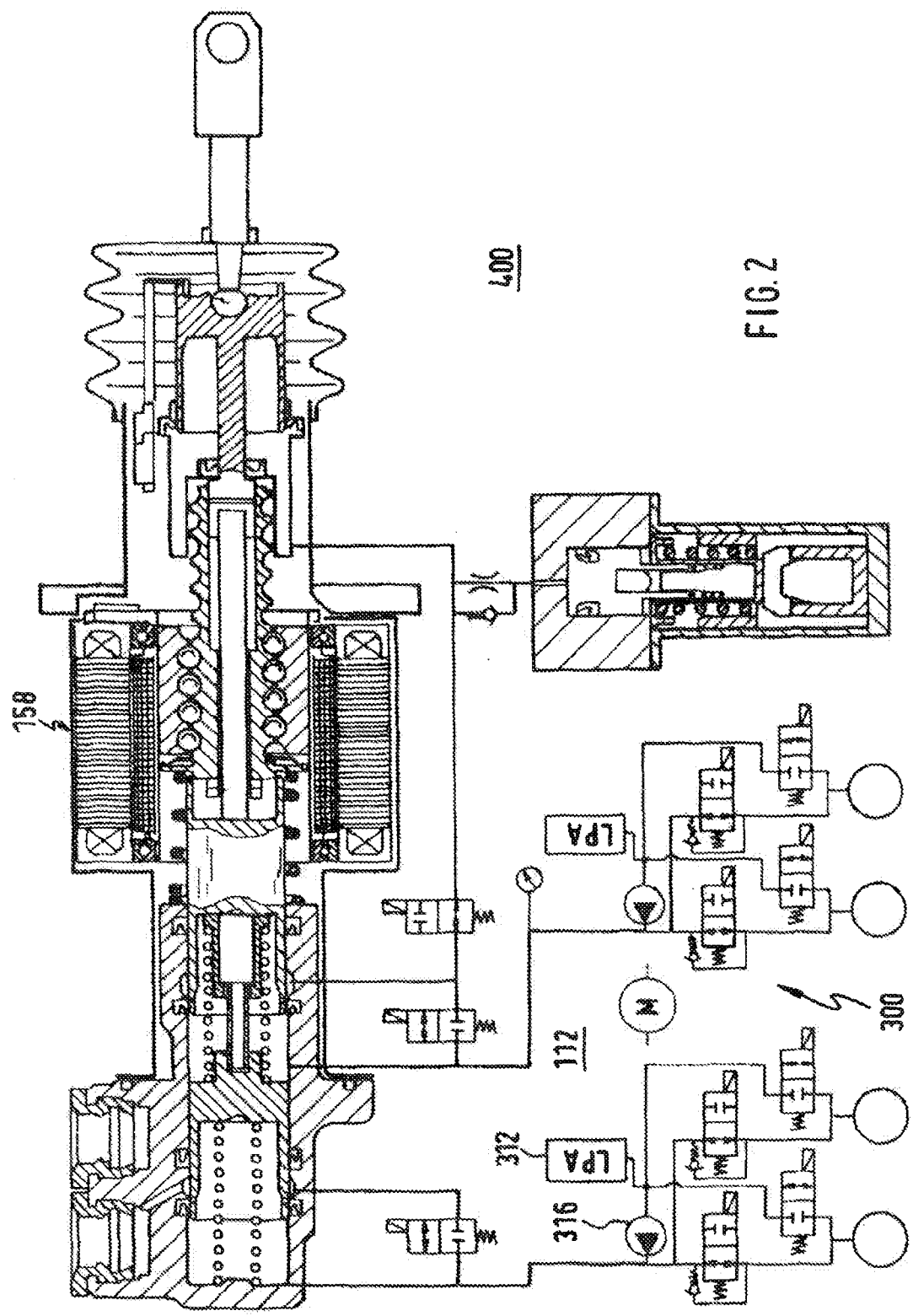
FIG. 2 shows a second embodiment of a hydraulic vehicle braking system.

FIG. 2 shows a vehicle braking system 400 according to an alternative embodiment. Since the embodiment according to FIG. 2 is based on the embodiment according to FIG. 1 described above, in the following only the differences will be explained in particular.

The vehicle braking system 400 according to FIG. 2 has a HCU 112 modified with respect to the first embodiment. To be more precise, the HCU 112 according to FIG. 2 still comprises the ABS valve arrangement 300 with the hydraulic pump 316 assigned to the ABS control mode and with the corresponding low-pressure accumulator 312. But the valves for the brake control mode different from the ABS control mode (e.g. the TCS and ESP mode) are omitted (cf. valves 324 and 328 in FIG. 1).

In the braking system 400 according to FIG. 2, the hydraulic pressure modulation takes place in the case of a brake control mode different from the ABS control mode by means of the electromechanical actuator 158. In other words, the electromechanical actuator 158 according to the second embodiment is driven not only for brake force generation in the context of a service braking, but also, for example, in the TCS and/or ESP control mode. The corresponding control device of the electromechanical actuator 158 is therefore likewise modified with respect to the first embodiment.

Figure 3:
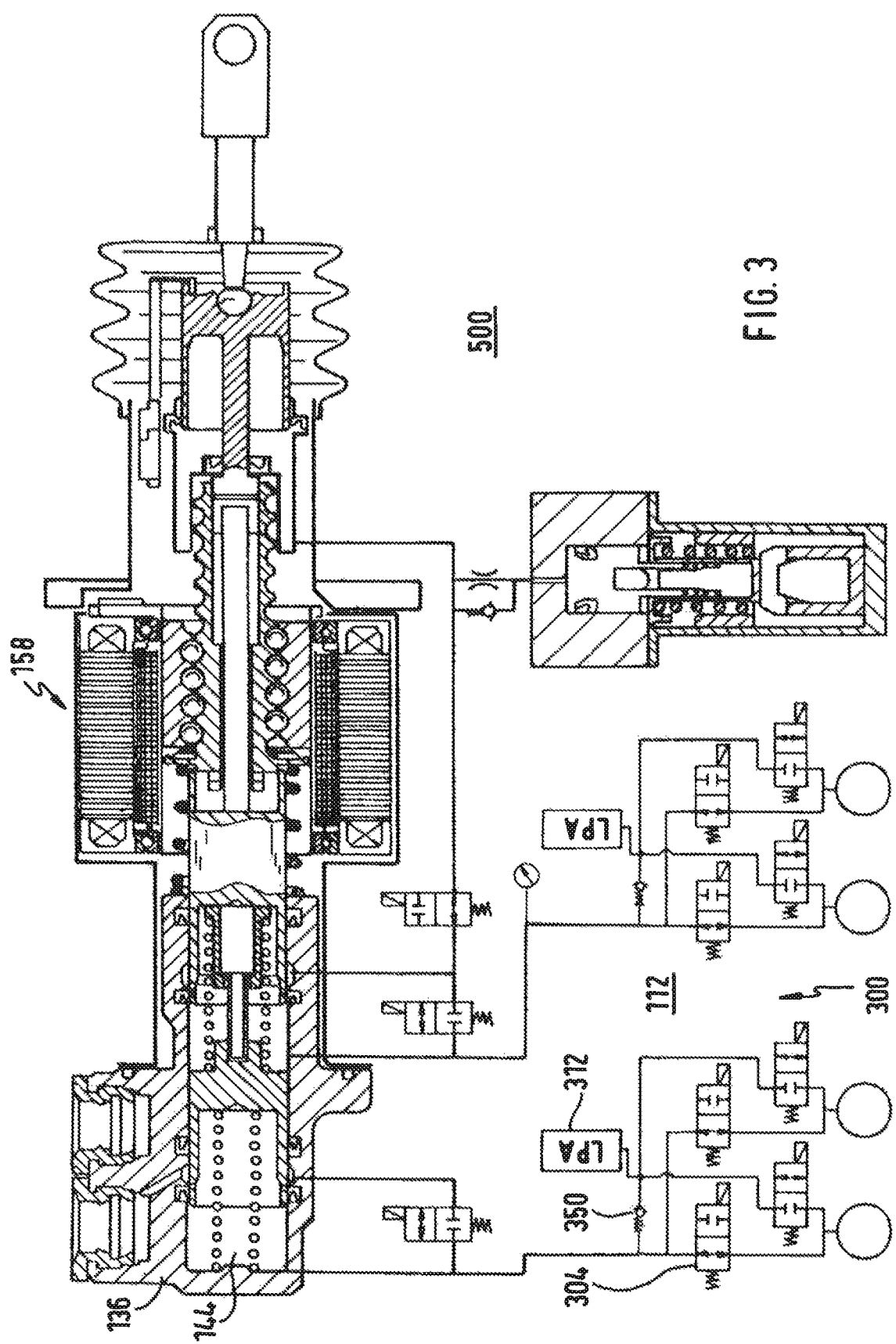
FIG. 3 shows a third embodiment of a hydraulic vehicle braking system.

FIG. 3 shows a vehicle braking system 500 according to a further embodiment. The embodiment according to FIG. 3 is based on the embodiment according to FIG. 2, so that in the following only the differences will be explained in more detail.

Compared with the embodiment according to FIG. 2, in the case of the braking system 500 the hydraulic pressure generator of the HCU 112 has been dispensed with (cf. hydraulic pump 316 and the electric motor 320 assigned to it in FIG. 2). Furthermore, a non-return valve 350 is provided between the low-pressure accumulator 312 and the inlet side of the ABS valve 304. The non-return valve 350 is switched in such a manner that hydraulic fluid conveyed from the hydraulic chamber 144 of the master cylinder 136 cannot pass into the low-pressure accumulator 312.

The electromechanical actuator 158 in the braking system 500 according to FIG. 3 performs additionally also the pressure modulation in the context of the ABS control mode. A corresponding control mechanism is implemented for this purpose in the control device provided for the electromechanical actuator 158.

As emerges from the above description of exemplary embodiments, only conventional dynamic requirements are to be met by the electromechanical actuator 158 provided (at least) for the brake force generation upon a pedal actuation, since a conventional ABS valve arrangement 300 can be used in the vehicle braking systems 100, 400, 500. The dynamic requirements to be met by the electromechanical actuator 158 are therefore in particular low in comparison with vehicle braking systems according to the multiplex design. Consequently, the technical complexity of the electromechanical actuator 158 is relatively low.

Moreover, in relation to the HCU 112, it is possible to resort to components which have proved to be reliable over many years in production. This fact ensures a high degree of safety combined with cost benefits.

Furthermore, the HCU 112 proposed in the different embodiments ensures a certain redundancy, which likewise increases safety. Thus, for example, in relation to the vehicle braking system 100 according to FIG. 1, there is provided a redundant system for the driver-independent hydraulic setup. Consequently, in the event of failure of or a fault with the electromechanical actuator 158, an automatic braking procedure, in particular an emergency braking, can still be initiated.

It will be understood that, according to alternative embodiments, the vehicle braking system may also be a regenerative vehicle braking system, or a conventional vehicle braking system not operated according to the BBW principle. In such embodiments, too, the technique described here may be employed.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A hydraulic vehicle braking system comprising:
a master cylinder having at least one piston displaceably accommodated therein;
a mechanical actuator, coupled or couplable to a brake pedal, for actuating the piston;
an electromechanical actuator for actuating the piston, the electromechanical actuator being drivable at least for brake force generation upon an actuation of the brake pedal;
a decoupling device for selectively decoupling the brake pedal from the piston of the master cylinder, the decoupling device comprising a first hydraulic chamber hydraulically connected to a hydraulic fluid reservoir, and a third valve for shutting off the hydraulic connection between the first hydraulic chamber and the hydraulic fluid reservoir,
a simulation device for providing a pedal reaction behaviour when the brake pedal is decoupled from the piston, the simulation device comprising a second hydraulic chamber connected to the first hydraulic chamber;
a first valve arrangement, which for a wheel brake has a first valve for selectively uncoupling the wheel brake from the master cylinder and a second valve for selectively reducing the brake pressure at the wheel brake, the first valve arrangement being drivable at least in the context of an ABS control mode; and
at least one low-pressure accumulator, which is configured to be coupled to the wheel brake via the second valve assigned to the wheel brake, in order to receive hydraulic fluid discharged in the context of a brake pressure reduction the at least one low-pressure accumulator being coupled to an inlet side of the first valve in order to release the received hydraulic fluid via a non-return valve.

2. The vehicle braking system according to claim 1, the electromechanical actuator having a transmission extending concentrically with respect to the mechanical actuator.

3. The vehicle braking system according to claim 2, the transmission being configured as a nut/spindle arrangement.

4. The vehicle braking system according to claim 3, the electromechanical actuator having at least one electric motor with a rotor extending concentrically with respect to the mechanical actuator.

5. The vehicle braking system according to claim 4, the rotor driving the nut/spindle arrangement or forming a component of the nut/spindle arrangement.

6. The vehicle braking system according to claim 1, further comprising:
an electrically operated hydraulic pressure generator provided in addition to the master cylinder, the hydraulic pressure generator being drivable in a brake control mode which is different from the brake force boosting or brake force generation upon an actuation of the brake pedal.

7. The vehicle braking system according to claim 6, the at least one low-pressure accumulator being coupled to an inlet side of the hydraulic pressure generator in order to release the received hydraulic fluid.

8. The vehicle braking system according to claim 6,
the electromechanical actuator being drivable exclusively for the purpose of the brake force generation upon an actuation of the brake pedal.

9. The vehicle braking system according to claim 6,
the electromechanical actuator being drivable in at least one brake control mode which is different from the ABS control mode; and
the hydraulic pressure generator being drivable exclusively in the ABS control mode.

10. The vehicle braking system according to claim 9, the brake control mode which is different from the ABS control mode comprising at least one of the following operating modes:

a traction control mode; and an electronic stability program, or ESP.

11. The vehicle braking system according to claim 6, further comprising:
a second valve arrangement, which is configured for selectively uncoupling the master cylinder from an outlet side of the hydraulic pressure generator in at least one of the following operating modes:
a traction control mode; and
an electronic stability program.

12. The vehicle braking system according to claim 11, further comprising:
a third valve arrangement, which is configured for at least one of the following purposes:
for reducing hydraulic pressure in the event of failure of the electromechanical actuator; and
for selectively coupling at least one chamber of the master cylinder, in which the piston is accommodated, to the hydraulic fluid reservoir.

13. The vehicle braking system according to claim 12, the third valve arrangement being configured to selectively couple, when the first valve is open, the associated wheel brake to the hydraulic fluid reservoir for hydraulic pressure reduction.

14. The vehicle braking system according to claim 12, the third valve arrangement being configured to couple, in a regenerative braking mode, the chamber of the master cylinder to the hydraulic fluid reservoir.

15. The vehicle braking system according to claim 1, the vehicle braking system having no electric motor-actuable hydraulic pressure generator provided in addition to the master cylinder.

16. The vehicle braking system according to claim 15, the electromechanical actuator being drivable in the context of a brake control mode which is different from the brake pressure boosting or brake pressure generation upon an actuation of the brake pedal.

17. The vehicle braking system according to claim 16, the brake control mode comprising the ABS control mode.

18. A method for operating a hydraulic vehicle braking system having:
a master cylinder having at least one piston displaceably accommodated therein,
a mechanical actuator, coupled or couplable to a brake pedal, for actuating the piston,
an electromechanical actuator for actuating the piston,
a decoupling device for selectively decoupling the brake pedal from the piston of the master cylinder, the decoupling device comprising a first hydraulic chamber hydraulically connected to a hydraulic fluid reservoir, and a third valve for shutting off the hydraulic connection between the first hydraulic chamber and the hydraulic fluid reservoir,
a simulation device for providing a pedal reaction behaviour when the brake pedal is decoupled from the piston, the simulation device comprising a second hydraulic chamber connected to the first hydraulic chamber;
a first valve arrangement, which for a wheel brake has a first valve for selectively uncoupling the wheel brake from the master cylinder and a second valve for selectively reducing the brake pressure at the wheel brake, and
at least one low-pressure accumulator,
comprising the steps of:
situating the third valve in a closed position for decoupling the brake pedal;
driving the electromechanical actuator at least for brake force generation upon an actuation of the brake pedal,
driving the first valve arrangement at least in the context of an ABS control mode, coupling the low-pressure accumulator to the wheel brake via the second valve assigned to the wheel brake, in order to receive hydraulic fluid discharged in the context of a brake pressure reduction, and
coupling the low-pressure accumulator to an inlet side of the first valve, in order to release the received hydraulic fluid via a non-return valve.

* * * * *